United States Patent [19]

Blanshine

[11] 4,172,355
[45] Oct. 30, 1979

[54] UPPER APRON ASSEMBLY

[75] Inventor: Allison W. Blanshine, Lititz, Pa.

[73] Assignee: Sperry Rand Corporation, New Holland, Pa.

[21] Appl. No.: 922,714

[22] Filed: Jul. 7, 1978

[51] Int. Cl.² .......................................... A01D 39/00
[52] U.S. Cl. ...................................... 56/341; 100/88
[58] Field of Search .............. 56/341, 343, 1, DIG. 2; 100/88

[56] References Cited

U.S. PATENT DOCUMENTS

| | | | |
|---|---|---|---|
| 3,110,145 | 11/1963 | Avery | 56/1 |
| 3,722,197 | 3/1973 | Vermeer | 56/341 |
| 3,859,909 | 1/1975 | Mast | 100/88 |
| 4,143,505 | 3/1979 | Sheesley et al. | 56/341 |

*Primary Examiner*—Russell R. Kinsey
*Attorney, Agent, or Firm*—Ralph D'Alessandro; Frank A. Seemar; John B. Mitchell

[57] ABSTRACT

In a crop roll forming machine there is provided bale forming means having endless flexible movable means fastened to opposing sides of the frame of the machine, the movable means being interconnected by a plurality of transverse connecting means having interwoven thereamong endless, flexible strengthening means. The interwoven strengthening means serve to reinforce the transverse connecting means as the bale forming means progressively forms a larger crop roll.

8 Claims, 3 Drawing Figures

UPPER APRON ASSEMBLY

BACKGROUND OF THE INVENTION

This invention primarily is concerned with crop roll forming machines. More particularly it presents an improved bale forming means that will permit the bale forming means to form larger rolls of crop material without having these larger crop rolls damage the bale forming means.

The forming of large compact rolls of crop material from precut and dried windrows of forage crops recently has become increasingly popular and commercially valuable in the agricultural industry. Several methods for forming large compact rolls of crop material have evolved. In one of these methods a machine rolls a swath or windrow of crop material along the ground until a roll of desired size is obtained. An example of a machine utilizing this method is shown in U.S. Pat. No. 3,110,145, dated Nov. 12, 1963. This method of forming bales or large rolls of crop material suffers from the principal disadvantage of leaving a varying amount of the crop material on the ground without including it in the crop roll. Additionally, dirt, clods of earth or stones can also be picked up by the roll and included therein. This is undesirable under circumstances where the baled crop material is used as fodder for livestock.

A later and commercially more successful method of forming crop rolls utilizes a machine in which the precut and dried crop material is picked up from swaths or windrows from the field and directed onto a lower conveyor. The conveyor then transports the crop material to a bale forming region where an upper apron or flight of belts, usually positioned above and adjacent the conveyor, moves in a suitable direction to rotate the crop material with which it is brought into contact. Variations of this type of machine are illustrated in U.S. Pat. No. 3,859,909 to Mast, dated Jan. 14, 1975 and U.S. Pat. No. 3,722,197 dated Mar. 27, 1973.

Variations of the machines of this latter type utilizing a lower conveyor have attempted to produce increasingly larger sized bales in response to the currently increasing demand and popularity of these large roll forming machines. This demand primarily has been spurred by the ability to use these crop roll forming machines in a wider range of crop materials and by the increasing interest being shown by commercial hay operators in large round bales. The formation of larger bales of rolled crop material in machines utilizing lower conveyors naturally has resulted in greater loads being applied to the upper apron or flight of belts as the rolled bale's diameter and mass increases while this apron or flight of belts attempts to apply greater tension to ensure that the formed bale has a uniform compactness and density throughout. This has required that the upper apron or flight of belts be able to withstand these greater loads.

Crop roll forming machines of the type earlier referred to in U.S. Pat. No. 3,859,909 to Mast utilize an upper apron comprising a pair of endless, flexible link-type chains positioned on opposing sides of the frame and interconnected by a plurality of parallel spaced apart transverse connecting means or slat-type members. Attempts to increase the bale size in this type of roll forming machine require that the transverse connecting means be lengthened. The longer these transverse connecting means are made, the greater will be the mass and size of the crop rolls formed by these machines. However, these larger crop rolls will subject the transverse connecting means to greater stress loads and increase the likelihood of bending or deforming the transverse connecting means. This load naturally will be greatest for green, moist crops. If the transverse connecting means are subjected to sufficiently great loads by the increased crop roll size, the transverse connecting means will bend outwardly sufficiently to cause the crop roll forming machine to become inoperative.

The foregoing problem is solved in the design of the machine comprising the present invention by substantially reinforcing the transverse connecting means of the upper apron so that the transverse connecting means are able to withstand the increased loads to which these connecting means are subjected as the size of the crop rolls is increased.

SUMMARY OF THE INVENTION

It is a principal object of the present invention to provide an improved crop roll forming machine that will permit the transverse connecting means of the upper apron to be able to sustain the increased loads to which they are subjected when larger sized crop rolls are formed.

It is another object of the present invention to provide an improved crop roll forming machine that will be able to roll heavy, wet, succulent crops into larger sized bales without having the transverse connecting means bend.

It is a further object of the invention to provide strengthening means for the transverse connecting means that will be mutually supportive of one another as well as of the upper apron as it is subjected to the increasing mass and weight of the larger sized crop roll being formed.

These and other objects and advantages are obtained by providing an improved crop roll forming machine having endless flexible movable means fastened to opposing sides of the frame of the machine and being interconnected by a plurality of transverse connecting means having interwoven thereamong endless, flexible strengthening means. The interwoven strengthening means serve to reinforce the transverse connecting means as the bale forming means progressively forms a larger crop roll.

BRIEF DESCRIPTION OF THE DRAWINGS

The advantages of this invention will become apparent upon consideration of the following detailed disclosure of the invention especially when it is taken in conjunction with the accompanying drawings wherein.

DETAILED DESCRIPTION OF THE PREFERRED EMBODIMENT

Figure 1:
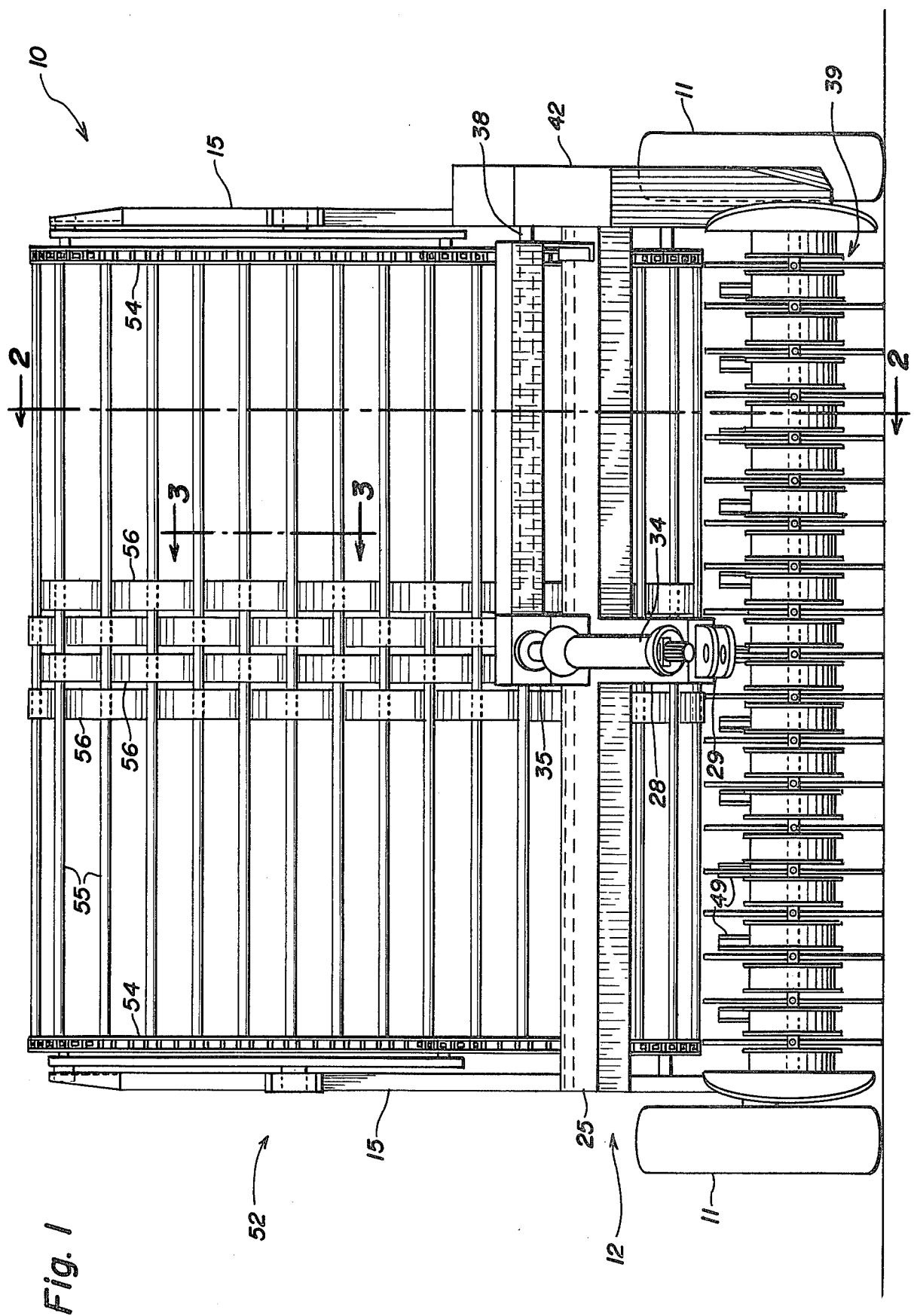
FIG. 1 is a front elevation of the crop roll forming machine illustrating the alternately interwoven pattern of the strengthening means among the transverse connecting means of the upper apron.

FIG. 1 is a front view of a crop roll forming machine 10 generally showing the major functional component bassemblies. The machine 10 is mounted to a pair of wheels 11 which allow the machine to be mobile. The machine 10 will be described generally hereafter, however, a more detailed description of this type of roll forming machine 10 is contained in U.S. Pat. No. 3,859,909 to Mast, dated Jan. 14, 1975, herein specifically incorporated by reference in its entirety.

Machine 10 has a base frame 12 that has similar side arrangements of structural members fixedly connected together, such as by welding. Each side of the frame comprises a bottom horizontal member 14, best shown in FIG. 2, with the forward end of the member connected to a vertical member 15 of substantial height. Extending perpendicularly to the junction of members 14 and 15 is a cross member 16, the adjacent end of which is fixedly connected to the junction of members 14 to 15. A short member 18 extends upwardly and rearwardly from the junction of bottom horizontal member 14 and a rear cross member 19. Short member 18 is connected by an angular brace member 20 to vertical member 15 and at its uppermost extremity to a second elongated angular brace member 21. Elongated angular brace member 21 is fixedly fastened to vertical member 15 by cross member 22 at the top of member 15. Projecting downwardly and forwardly from vertical member 15 is a side sheet cross brace 24 which connects to a horizontal bracing member 25 that spans the transverse width of the roll forming machine 10. Horizontal bracing member 25 is fastened at both its lateral ends to a further side sheet horizontal bracing member 26. Bracing member 26 is fixedly fastened at its rearmost portion to vertical member 15. Extending forwardly and intermediately of horizontal bracing member 25 is hitch beam 28, to which is attached at its most forward location tractor hitch 29, as shown in FIG. 1.

Figure 2:
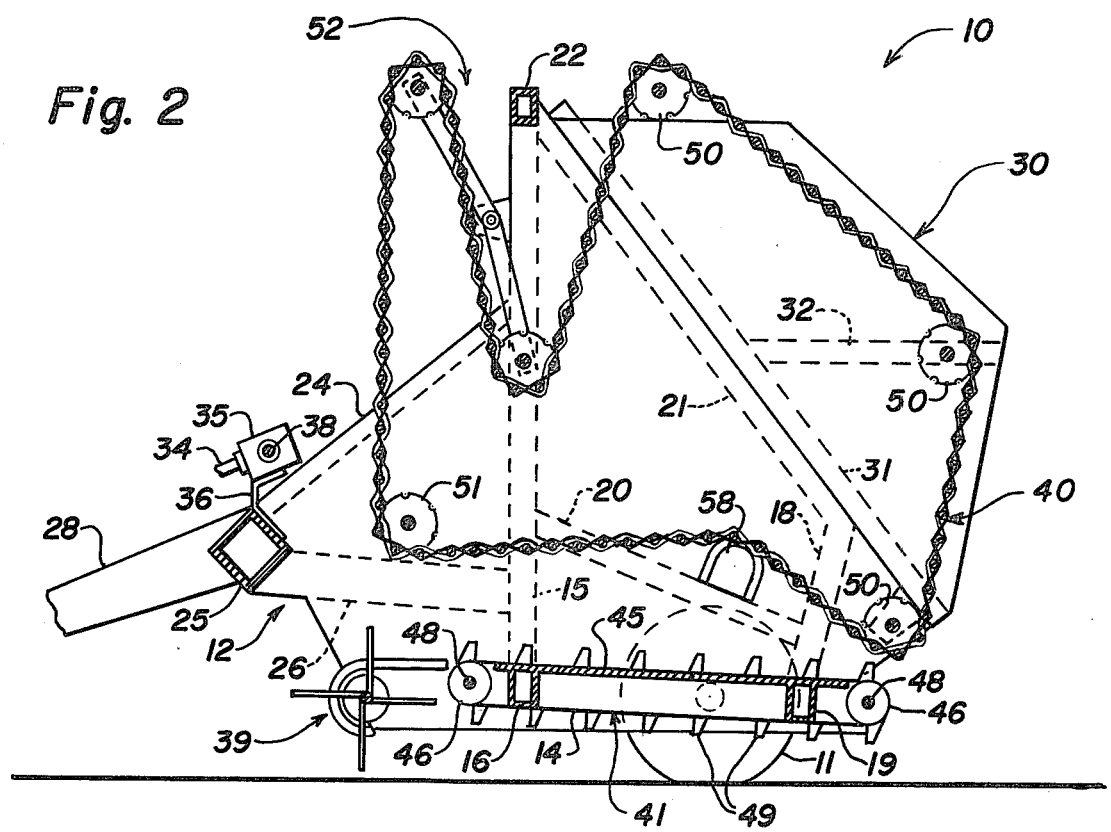
FIG. 2 is a side elevation of a complete section of a crop roll forming machine showing the alternately interwoven pattern of the strengthening means about the entire upper apron.

The rear of the roll forming machine 10 has a pivotable tailgate indicated generally by the numeral 30 in FIG. 2. The tailgate pivots generally about a hinge point (not shown) adjacent cross member 22. The tailgate 30 is pivoted by means of a pair of hydraulic cylinders (not shown), one affixed to each side of the machine 10. The tailgate 30 has an angular bracing member 31 adjacent the elongated angular brace member 21 of the base frame 12. Tailgate horizontal brace member 32 reinforces the tailgate 30 and connects intermediately with tailgate angular brace member 31. The various frame members thusly described comprise the base frame 12 and the tailgate 30. They may be formed from heavy structural tubing, channels, or any other appropriate structural form commonly employed in framing of the type described.

The forward end of the roll forming machine 10, as shown in FIGS. 1 and 2, has a drive shaft 34 aligned along the same axis as the tractor hitch beam 28 but positioned thereabove. The drive shaft 34 is adaptable to be connected to the power takeoff of a towing vehicle, such as a tractor (not shown). The drive shaft 34 is connected to an appropriate right angle gearbox 35 mounted via bracket 36 to the horizontal bracing member 25. A power output shaft 38 extends from the right angled gearbox 35 to one side of the machine to transfer power from the gearbox 35 through a system of belted sheaves and drive sprockets to the operational elements. The power thusly supplied drives the pickup, indicated generally by the numeral 39 as seen in FIG. 1, the upper apron indicated generally by the numeral 40, and the lower apron or conveyor indicated generally by the numeral 41 in FIG. 2. The belted sheaves and sprockets (not shown) of the roll forming machine 10 which transfer the rotary power to the operational elements are covered by side shrouds illustrated generally by the numeral 42 in FIG. 1.

Extending forwardly from the front end of the base frame 12 is a pickup 39 as seen in FIGS. 1 and 2. This pickup is adapted to engage, elevate and rearwardly feed a swath or windrow of crop material into the roll forming machine. The material engaged by the pickup passes rearwardly from the entrance end of lower apron 41 towards the rear of the machine 10. The lower apron 41 comprises a conveying means having a series of endless, flexible chains (not shown) which are uniformly spaced transversely across the plane generally defined by the floor 45 of the roll forming machine 10, as best shown in FIG. 2. The endless, flexible chains extend around sprockets 46 rotatably mounted on shafts 48 at the forward and rearward ends of the roll forming machine 10. The flexible chains comprising the lower apron 41 have lugs 49 attached to the links of the chains to engage and direct the crop material rearwardly across the floor portion of the roll forming machine 10. It should be noted that while the conveying means is herein described as a series of endless, flexible chains any conveying means, such as a series of floor rolls or belts, could equally well be utilized with the invention described herein.

The crop material is transferred rearwardly by the lower apron 41 until it is brought into contact with the upper apron 40. The upper apron 40, as best seen in FIG. 2, is guided in a predetermined path about the crop roll forming machine 10 on a series of sprockets 50. A drive sprocket 51 is connected via an appropriate drive transfer means to the power output shaft 38. As the crop roll expands the upper apron 40 is permitted to be played out to wrap about the expanding diameter of the roll by means of a pivotable auxiliary frame, indicated generally by the numeral 52. A more detailed description of this auxiliary frame 52 is not made at this time since the structure is old in the art and is described in detail in prior U.S. Pat. No. 3,939,631, issued Feb. 24, 1976 to Blanshine, herein specifically incorporated by reference in its entirety.

Figure 3:
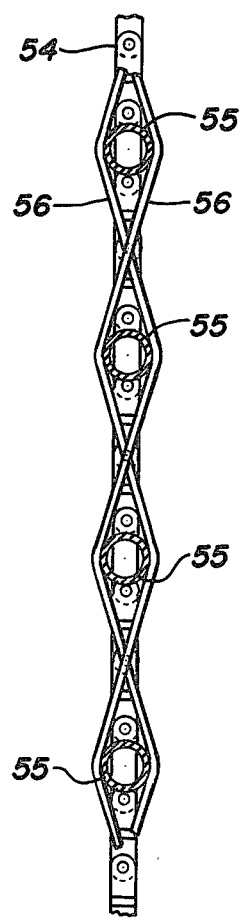
FIG. 3 is a side sectional view of a portion of the upper apron showing the alternately interwoven pattern of the strengthening means through the individual transverse connecting means.

The upper apron 40 further comprises a pair of endless, flexible chains 54 interconnected by a series of parallel, spaced apart transverse connecting means in the form of slats or rods 55 as best seen in FIG. 3. Interwoven intermediately of the transverse length of the series of transverse connecting means or rods 55 is a series of strengthening means or belts 56, best seen in FIG. 1. The strengthening means 56 are interwoven alternately among the transverse connecting means or rods 55. The transverse connecting means or rods 55 may be round or of any other suitable geometric cross-sectional shape. The strengthening means 56 may be comprised of elastic rubber belts or any other suitable material. Although a plurality of strengthening means is shown, it is possible to utilize as few as a pair of interwoven strengthening means to provide equally satisfactory results. The strengthening means 56 are alternately interwoven in reversed pattern so that any two adjacent strengthening means are woven or threaded among the connecting means or rods 55 in the opposite manner.

This permits each connecting means or rod 55 to be in contact with any two adjacent strengthening means 56 both interiorly and exteriorly of the transverse center line of the roll forming machine or baler 10.

The upper apron 40 is played out to encompass the ever increasing diameter of the crop roll being formed in response to the tensioning means (not shown), as shown and described in detail in the previously mentioned U.S. Pat. No. 3,939,631. The tensioning means operates to maintain the upper apron 40 in contact with the roll of crop as it is being formed so that the desired density of material can be obtained. The lower course of the upper apron 40 also slidably extends over the upper curved surface of retractably mounted auxiliary guide members 58, of the type described in detail in U.S. Pat. No. 3,815,345, dated June 11, 1974 to Mast. These auxiliary guide members 58 are spring loaded and are adapted to be retracted into accommodating spaces in the side plates of the machine so as not to interfere with the ends of the roll of crop material as the roll is being formed. Therefore, as the roll increases in diameter the auxiliary guide plates 84 will be pushed through suitable openings so as not to interfere with the ends of the roll as the roll increases in diameter. Simultaneously, the auxiliary frame 52 will play out, under tension, an increasing length of the upper apron 41 to permit the expanding crop roll diameter to be encompassed by the upper apron until a full sized crop roll is formed.

In operation, as the roll forming machine 10 is drawn over a field by a towing vehicle its pickup 39 retrieves a swath or windrow of crop material from the field, elevating and transporting this material onto the floor 45 of the roll forming machine 10. This material is placed on the floor 45 where the lugs 49 mounted on the flexible chains of the lower apron 41 transport the material from the front portion of the floor towards the rear. Thus, a continuous stream of crop material is delivered to the floor of the machine and then is directed to the rearmost portion of this floor where it contacts the upper apron 40. The upper apron 40 is rotating in a suitable direction, in combination with the direction of rotation of the lower apron chains, to cause the crop material to be rotated so as to form the material into a roll. The larger sized roll being formed by machines of this type necessarily exerts a greater load upon the transverse connecting means 55 of the upper apron 40. The upper apron 40 is reinforced by means of the strengthening means 56 which are alternately interwoven among the transverse connecting means 55. This permits a completed crop roll of substantially greater size than that heretofore produced by roll forming machines of this type to be formed without damaging the structural elements of the upper apron 40.

When the roll of crop material is finally formed and it is desired to discharge the formed roll from the machine, the tailgate 30 is elevated through the use of hydraulic cylinders and the lugs 49 mounted on the chains of the lower apron 41 positively engage the bottommost portion of the rolled crop material. This causes the roll of material to be moved rearwardly until it is urged off the roll forming machine 10.

Although a plurality of strengthening means is the preferred structure, suitable results may be obtained by using as few as a pair of strengthening means alternately interwoven in a reversed pattern. While the phenomena is not fully understood, when only a pair is used the strengthening means track laterally across the transverse length of the connecting means or rods for a distance of approximately one foot in each direction in apparent response to the forces to which the upper apron is subjected as the crop material is fed by the pickup in a generally oscillatory pattern across the width of the front portion of the floor as a bale or roll is formed. The reversed pattern of the interwoven strengthening means both prevents their walking over the tops of one another as well as helps to reinforce the transverse connecting means or rods as the bale presses outwardly against the upper apron. Additionally, under certain circumstances a single interwoven strengthening means may be functionally acceptable.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangement of parts which will occur to one of skill in the art upon a reading of this disclosure. Similarly, it will be obvious to one of ordinary skill in the art that strengthening means of the type described herein can readily be used in any type baler or roll forming machine which employs a rigid type upper apron or bale forming means.

Having thus described the invention, what is claimed is:

1. In a roll forming machine having a mobile frame with opposing sides, a bale forming region, a pickup for delivering crop material from a field to the bale forming region, and drive means, the improvement comprising: bale forming means supported by end support members movably fastened to the opposing sides of the frame and including a pair of endless flexible movable means interconnected transversely across the width of the bale forming region by a plurality of transverse connecting means fastened thereto, the connecting means having alternately interwoven thereamong endless flexible strengthening means such that upon activation of the drive means the bale forming means are moved in a predetermined direction so that the crop material is brought into contact with at least a portion of the transverse connecting means to rotatively form a crop roll while the strengthening means reinforce the connecting means.

2. The roll forming machine according to claim 1, wherein the bale forming means further comprises an upper apron including a plurality of spaced apart parallel transverse rods, the pair of endless flexible movable means further including a pair of chains, the transverse rods interconnecting the pair of endless flexible chains across the width of the bale forming region.

3. The roll forming machine according to claim 2, wherein the endless flexible interwoven strengthening means comprises a plurality of belts alternately interwoven among the transverse connecting rods.

4. The roll forming machine according to claim 3, wherein any adjacent two of the alternately interwoven strengthening means are reversedly woven in a pattern among successively adjacent transverse connecting means so that each connecting means is in surface contact with the adjacent strengthening means on opposing sides of the peripheral surface of the connecting means.

5. In a roll forming machine adapted to be pulled by a towing vehicle across a field which has preformed windrows of crop material aligned thereon, the combination comprising:

(a) a mobile frame;

(b) a pickup for collecting the crop material from the windrows and delivering it to the bale forming region;

(c) an upper bale forming means and a lower bale forming means movably affixed to the frame and defining therebetween a bale forming region, the lower bale forming means further defining the lower limit of the bale forming region, the upper bale forming means defining a generally curvilinear surface which follows a predetermined path about the bale forming region, the upper bale forming means further including a pair of endless flexible chains interconnected by a plurality of spaced apart parallel transverse connecting means with a plurality of endless flexible means alternately interwoven thereamong to further define the curvilinear surface and reinforce the transverse connecting means; and (d) drive means connected to the upper and lower bale forming means and the pickup to cause the crop material to be brought to the bale forming region and into contact with the upper and lower bale forming means which are thereby driven to cause the crop material to be formed into crop rolls.

6. The roll forming machine according to claim 4, wherein the spaced apart parallel transverse connecting means of the upper bale forming means further comprises a plurality of transverse rods interconnecting the pair of endless flexible chains, the transverse rods spanning the width of the bale forming region.

7. The roll forming machine according to claim 5, wherein the endless flexible means alternately interwoven among the transverse rods further comprises a plurality of belts.

8. The roll forming machine according to claims 5, 6, or 7, wherein the alternately interwoven endless flexible means are reversedly woven in a pattern among successively adjacent transverse connecting means so that any two adjacent interwoven flexible means are in surface contact with each connecting means on two opposing surfaces of the periphery of each connecting means.

* * * * *